United States Patent [19]
Schmitz

[11] Patent Number: 6,078,908
[45] Date of Patent: Jun. 20, 2000

[54] METHOD FOR AUTHORIZING IN DATA TRANSMISSION SYSTEMS

[76] Inventor: Kim Schmitz, Humboldtstrasse 19, 81549 Munich, Germany

[21] Appl. No.: 09/064,421

[22] Filed: Apr. 22, 1998

[30] Foreign Application Priority Data

Apr. 29, 1997 [DE] Germany .......................... 197 18 103

[51] Int. Cl.[7] .................................................. G06F 17/60
[52] U.S. Cl. .................. 705/50; 340/825.3; 340/825.31; 705/1; 705/51
[58] Field of Search ........................... 340/825.3, 825.31; 380/3; 705/1, 44, 50, 51

[56] References Cited

U.S. PATENT DOCUMENTS

| | | | |
|---|---|---|---|
| 3,168,737 | 2/1965 | Weinstein | 340/825.31 X |
| 3,196,440 | 7/1965 | Weinstein | 340/825.31 X |
| 3,344,629 | 10/1967 | Burney | 340/825.31 X |
| 3,938,091 | 2/1976 | Atalla et al. | 340/149 A |
| 4,447,890 | 5/1984 | Duwel et al. | 705/403 |
| 5,224,046 | 6/1993 | Kim et al. | 705/403 |
| 5,367,464 | 11/1994 | Abumehdi et al. | 705/403 |
| 5,369,401 | 11/1994 | Haines | 705/403 |
| 5,612,884 | 3/1997 | Haines | 705/403 |
| 5,870,473 | 2/1999 | Boesch et al. | 380/21 |

FOREIGN PATENT DOCUMENTS

| | | |
|---|---|---|
| 0745961 | 5/1990 | European Pat. Off. . |
| 0416482 | 8/1990 | European Pat. Off. . |
| WO9519593 | 1/1995 | WIPO . |
| WO9600485 | 6/1995 | WIPO . |

*Primary Examiner*—Edward R. Cosimano
*Attorney, Agent, or Firm*—Horst M. Kasper

[57] ABSTRACT

The invention relates to a method and to a device for the authorization in data transmission systems employing a transaction authorization number (TAN) or a comparable password. According to a first step, the user sends a qualifying identification of the data input apparatus together with a request for the generation or for the selection of a transaction authorization number TAN or of comparable password from a data file from the data input apparatus to an authorization computer. In a second step the authorization computer generates the transaction authorization number TAN or the comparable password or selects them form a data file. According to a third step, the authorization computer sends the transaction authorization number TAN or the comparable password over a second transmission path different from the first transmission path to a monitor, for example a pager. According to a fourth step, the user reads this transaction authorization number TAN or the comparable password from the receiver and enters the transaction authorization number TAN or the comparable password into the data input apparatus. According to a fifth step, this transaction authorization number TAN or the comparable password is transmitted to the authorization computer. According to a sixth step, the authorization computer verifies the validity of the transaction authorization number TAN or of the comparable password in order to establish or switch free, according to a seventh step, a connection between the data input apparatus and the receiver unit.

21 Claims, 3 Drawing Sheets

METHOD FOR AUTHORIZING IN DATA TRANSMISSION SYSTEMS

BACKGROUND OF THE INVENTION

1. Field of the Invention

The invention relates to a method for authorizing in data transmission and communication systems.

2. Brief Description of the Background of the Invention Including Prior Art

It is known that in telebanking or in remote terminal banking the user requires in addition to his or her permanent password (personal identification number PIN) for each individual transaction additionally a transaction authorization number (TAN). Such transaction authorization numbers TANs are transmitted to the user in larger blocks by mail. Thus, there exists the risk that third persons receive knowledge of such transaction authorization numbers TANs and can perform a misuse in connection with the password. The risk is increased by such transaction authorization numbers TANs having a validity which is de facto unlimited in time.

Furthermore, call-back systems are known, wherein the called-in system assures based on a call-back at the generally stored telephone number that the calling system is authorized and that no foreign system pretends to be an authorized system. The disadvantage of the call-back systems comprises that an unauthorized user, who has procured a functional access to the authorized calling system from any possible source, can work without a problem based on this illegally obtained authorization, since the call-back system checks only whether the call-back system has been called by a system which is authorized in principle by a basically authorized system.

SUMMARY OF THE INVENTION

1. Purposes of the Invention

It is an object of the present invention to furnish a method for authorizing and an authorization process in combination with data transmission and data communication, wherein the security of the transmission or communication is increased.

These and other objects and advantages of the present invention will become evident from the description which follows.

2. Brief Description of the Invention

The present invention provides for a method for the authorization of data transmission systems. A qualifying identification of a user is entered into a data input apparatus. The qualifying identification and a request for an authorization signal is transmitted from the data input apparatus to an authorization computer along a first transmission path. The authorization signal is established in the authorization computer. The authorization signal is sent from the authorization computer to a monitor along a second transmission path different as compared to the first transmission path. The authorization signal at the monitor is read by the user. The authorization signal is entered into the data input apparatus. The authorization signal is transmitted from the data input apparatus to the authorization computer. The validity of the authorization signal is verified in the authorization computer. A connection is established between the data input apparatus and a receiver unit upon verification of the validity of the authorization signal.

The authorization signal can be transmitted from the data input apparatus to the authorization computer along the first transmission path.

Acceptance of the authorization signal during verification of the validity of the authorization signal by the authorizing computer can be limited to a predefined number of times, to a predefined user time, depending on a predefined number of data files being transmitted, or depending on a predefined size value of data files being transmitted.

A password can be employed for allowing accessing a member selected from the group consisting of the data input apparatus, the monitor, and the receiver unit.

The data transmitted from the data input apparatus to the receiver unit and vice versa or to the authorization computer and vice versa can be encoded.

An apparatus for authorizing access to a communication line includes a data input apparatus. An authorization computer is connected through a first transmission path to the data input apparatus. A monitor is connected to the authorization computer and disposed such that upon reading of an authorization signal on a monitor by a user, the user can enter the authorization signal into the data input apparatus. A receiver unit is connectable to the data input apparatus through a line switchable by the authorization computer between a connected state and a disconnected state.

The monitor can be a member selected from the group consisting of a pager, a handy, an email address, a net address, a telefax machine, a language output apparatus, an audio reproduction unit, a radio receiver, and a telephone.

The monitor can be a radio receiver incorporated into the data input apparatus. The radio receiver can furnish the authorization signal on a display monitor of the data input apparatus.

The radio receiver can include a user identification element furnished by a member selected from the group consisting of a magnetic card reader, a chip card reader, a graphic device for finger-print identification, and a graphic device for picture identification.

A first encoding module can be present in the authorization computer. A second encoding module can be present in the monitor. The encoding provided by the first encoding module matches the encoding of the second encoding module.

The receiver unit can furnish a door-locking mechanism.

The authorization computer and the receiver unit can be integrated into a single apparatus. Furthermore, the data input apparatus, the authorization computer, and the receiver unit can be integrated into one single apparatus.

Wireless telecommunication apparatuses, such as for example mobile or cellular phone (Handie-Talkie is a tradename of the Motorola Communications Division) or pagers, are frequently furnished with the possibility to receive short alphanumeric communications, for example of the Short Message Service known in Germany as SMS-DIENST, and to display these communications on their display screen. A paging system is a communications system for summoning individuals such as doctors and nurses or for making public announcements. The present invention employs this possibility to receive short alphanumeric communications in order to transmit a transaction authorization number or a comparable password.

According to the present invention, the user transmits his or her identification, such as user identification, password, or the like, and/or an identification characterization of the data input apparatus together with a request for generating a transaction authorization number TAN, or a comparable password, to a computer through a data input apparatus. The computer furnishes the authorization process and is therefore called in the following by the abbreviation authorizing computer. An alphanumeric or only numeric transaction authorization number TAN, or a comparable password, is calculated or read from a data file based on a random number generator in this authorization computer. This transaction authorization number TAN, or a similar password, is transmitted to a receiver by the authorizing computer through another transmission path disposed parallel to the existing connection with the data-input apparatus. This receiver can be for example:

a) a wireless receiver with a display or a monitor such as for example a mobile or cellular phone, a pager (for example a city-call receiver), b) a specially constructed receiver card within the data input apparatus, which is accessed wirelessly or through a fixed wiring;

c) a mailbox;

d) a telefax apparatus; or e) a language output apparatus such as a fixed installed audio speaker or a telephone for the language transmission.

The authorization computer includes a memory storage and has available the required telephone numbers, wireless call numbers, or fax numbers, email addresses or network addresses. The data referring to this are usually stored in the authorization computer. However, it is possible that the authorization computer in turn shares and/or retrieves these data from a data source, which data source is resident on another computer. In addition, the authorization computer can also access this other computer on its own by using the method according to the present invention.

The authorized user can enter the thus transmitted transaction authorization number or the comparable password manually into his/her data input apparatus and send the transaction authorization number TAN again to the authorization computer. An automatic transmission of the transaction authorization number TAN or of the comparable password occurs according to the present invention in case of an automatic procedure. The authorization computer checks and verifies now the congruence and agreement between all valid transaction authorization numbers TANs or comparable passwords previously given out by the authorizing computer, and the authorization computer allows a release of the data flow between the data input apparatus and a receiver unit after this checking of the authorization.

The transaction authorization number or the comparable password can be a transaction authorization number for one single use. However, other limitations such as the user time and/or the number or the size of the data files to be transmitted relating are also conceivable for use in determining the validity of the transaction authorization number or of the comparable password.

Now, data can be transmitted from the data input apparatus to the receiver unit and vice versa, for example by full duplex, after a connection authorized in the above described manner has been established.

It is clear that these data can also be encrypted or encoded first and then transmitted for obtaining additional security.

Both the data input apparatus, as well as the authorization computer and the receiver unit can be furnished as standard personal computers. The present invention operates independent from the platform employed, i.e. independent of the type of processor, of the operating system and/or of the control electronics, for example of the receiver unit, and/or of the input/output units, for example of the data input apparatus and of the receiver unit.

The security of this system is based on the fact that a data transmission from the data input apparatus to the receiver unit has to be released and turned on by the authorization computer only in case of an authorization of the apparatus. This is accomplished by the employment of separate transmission paths between the data input apparatus and the authorization computer on the one hand, and between the authorization computer and the receiver unit on the other hand. The present invention is insofar distinguished from call-back systems, where only one checking occurs between the data input apparatus and the authorization computer.

The method according to the present invention allows to provide a number of different levels of security.

A wireless receiver, for example in the form of a plug-in card, is incorporated as a receiver in the data input apparatus, representing the lowest security level according to the present invention, such that a data transmission is possible to the receiver unit only with this concrete apparatus. In order to increase this security, it can be provided that this wireless receiver can only be operated with a user identification element, for example a magnetic card or a chip card. The user identification element can also operate with graphical methods, such as testing, verification and/or identification of a fingerprint or of a picture identification of the user.

The further security level according to the invention provides that the authorization computer transmits the transaction authorization number or the comparable password to a pager or a comparable apparatus. In this case, an authorization is furnished only when the data input apparatus and the pager are accessed by the same person. Only then is it possible that the transaction authorization number or a comparable password, displayed on the pager, are entered into the data input apparatus and are transmitted from there again to the authorization computer.

Data transmitted to a pager can however be branched off and be listened to. A further security step according to the invention can be obtained in the manner that matching encoding or encryption modules are employed in the authorization computer and in the pager.

Another receiver apparatus can be furnished according to be present invention instead of the pager or the mobile or cellular phone. This can for example be a mailbox, a telefax, a language output apparatus, a sound-receiver printed circuit board, or an audio-response unit. According to the invention, fixedly installed audio speakers or the transmission of the audio or voicemail to a defined telephone connection are possible to serve as an audio output unit and audio-response unit. An audio output of the transaction authorization number or of the comparable password is performed with the language output apparatus or audio-response unit.

It is clear that the transmission to such receiver apparatuses can also be encoded and/or encrypted.

Further encoding mechanisms can be dispensed with according to the present invention if one employs a mobile or cellular phone, in particular a global system for mobile communication or cellular phone, instead of a pager based on the encoding of the respective transmission technique. In this case, the display of the transaction authorization number or of the comparable password is performed on the display of the mobile or cellular phone.

A further step of security according to the present invention can be accomplished by establishing a connection between the data input apparatus and the authorization computer only when a corresponding password is transmitted through the data input apparatus. This password can be valid according to the present invention for a time, which is substantially longer than the transfer authorization number TAN.

A further step of security according to the present invention can be achieved by requiring also a password already for the use of the data input apparatus.

It is apparent that a combination of the precedingly recited step of security is possible.

The present invention can be universally employed in the region of data transmission systems. This holds for example also for the Internet and intranets, local area networks LAN, wide area networks WAN, etc.

The system in question can also be employed outside of the classic electronic data processing, for example in connection with physical access controls. For this purpose, the user enters for example his or her personal password on a keyboard, representing a data input apparatus, and located next to a door. The authorization computer checks and verifies this password, possibly also in connection with the access permission to the concrete space at the concrete time. If the respective password is still valid, then the authorization computer provides the transaction authorization number or the comparable password to a mobile or cellular phone or to an apparatus conceived for the special door closing system and functionally comparable with the pager. In the following, this transaction authorization number or the comparable password is entered manually by the user to a keyboard disposed in proximity of the door and is further transmitted automatically to the authorization computer. After a successful verification, a signal is provided by the authorization computer for a release of the door-locking mechanism. The release can be limited in time, if desired. The receiver unit can in this case be of the most simple nature relative to its technological construction, since the receiver unit only has to process the signal for the release of the door-locking mechanism in such a way that the respective electromechanical system releases the door for opening.

Thus, it is possible to construct a system where different persons have different authorizations for accessing different rooms.

The concrete fields of application comprise, for example:
computer centers
airports
ministries, government offices
customs
border transition points
security regions
banks
police and military applications
shielded storage, vaults, bank vaults
garages
parking houses
automobiles The complete system receives its security from the combination of several different base principles and factors:
(1) "what you have" (the global system for mobile communication GSM chip card not to be duplicated), i.e. a physically unique structure which cannot be transferred without loss.
(2) "what you know" (the PIN of the global system for mobile communication GSM chip card as well as the own user names in the data input apparatus and/or the authentication server), i.e. know-how which cannot be transferred without intent or by mistake.
(3) data encryption standard DES encoding and cryptographic authentication in the global system for mobile communication GSM net itself, whereby resistance against listening attacks and manipulating attacks is obtained.

The combination of at least three events, which events by themselves are already very improbable, is necessary for a compromising of the system:

a) physical loss of the mobile or cellular phone chip card, of the pager, or a foreign access to the mailbox, to the telefax, to the language output apparatus, or to the audio-delivery unit,
b) giving out of the PIN number of the receiver (for example of the chip card or of the mobile or cellular phone) and
c) knowledge of the transmitted transaction authorization number or of the comparable password.

An inadvertent coincidence of these factors is nearly excludable, since also in this case the successful attack on the system presupposes the intimate knowledge of the access procedure and of the user identification ID, which is usually not present in case of an attack. In addition, the user has the possibility to block immediately or to have blocked immediately his or her user identification ID at the authentication server upon a loss of his or her chip card.

A further advantage of the support of the global system for mobile communication GSM comprises that the user is reachable all the time during the authorization process, i.e. the user can be directly called by the system administrator in case of access problems or doubts in regard to the identity of the user.

This solution is associated with the advantage that the solution is very secure, low cost, and realizable with widely available and secure, conventional hardware.

A further solution according to the present invention comprises that the authorization computer and the receiver unit are present as a single apparatus.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
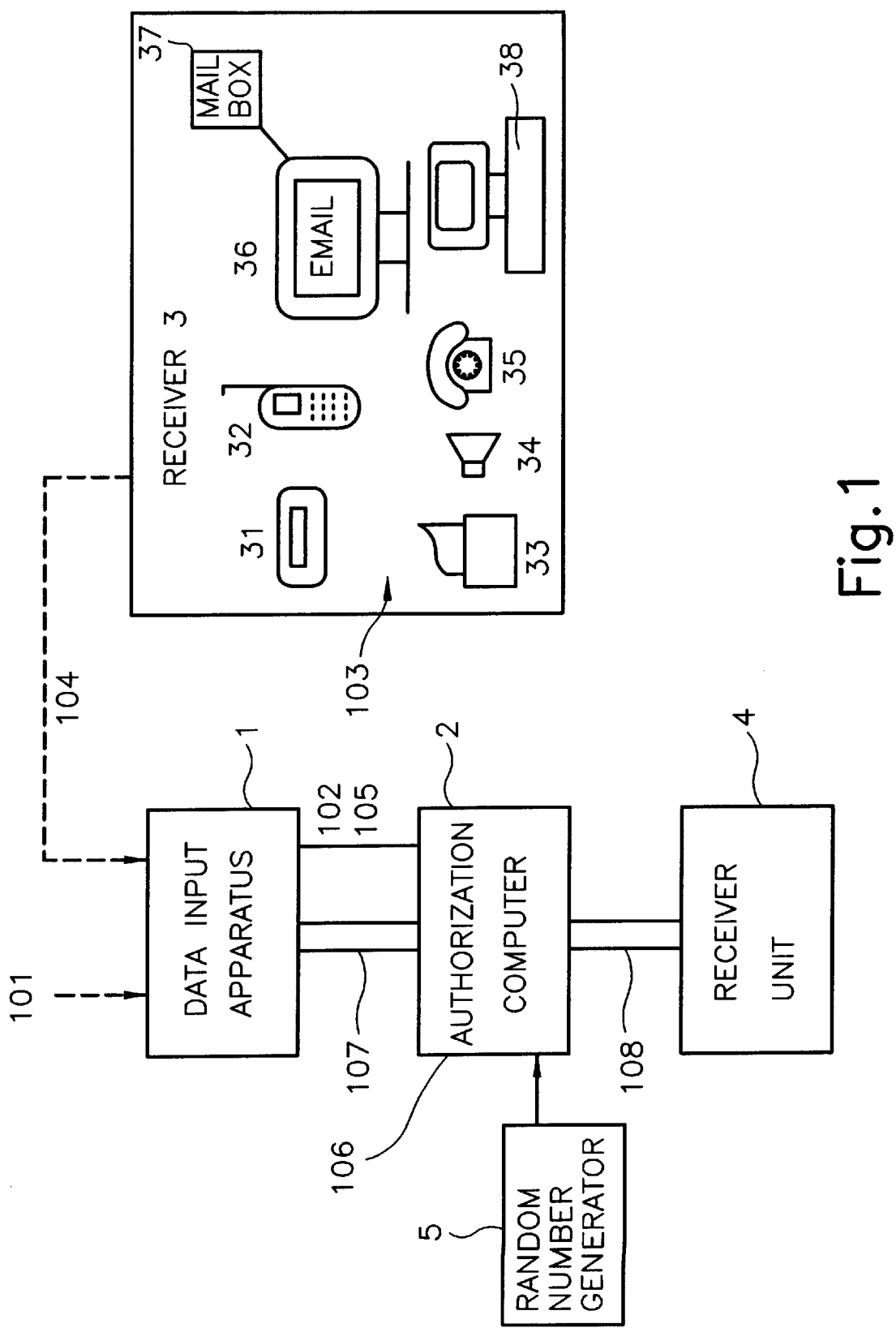
FIG. 1 is a view of a schematic diagram showing an operational system employing authorization in data transmission.
Figure 2:
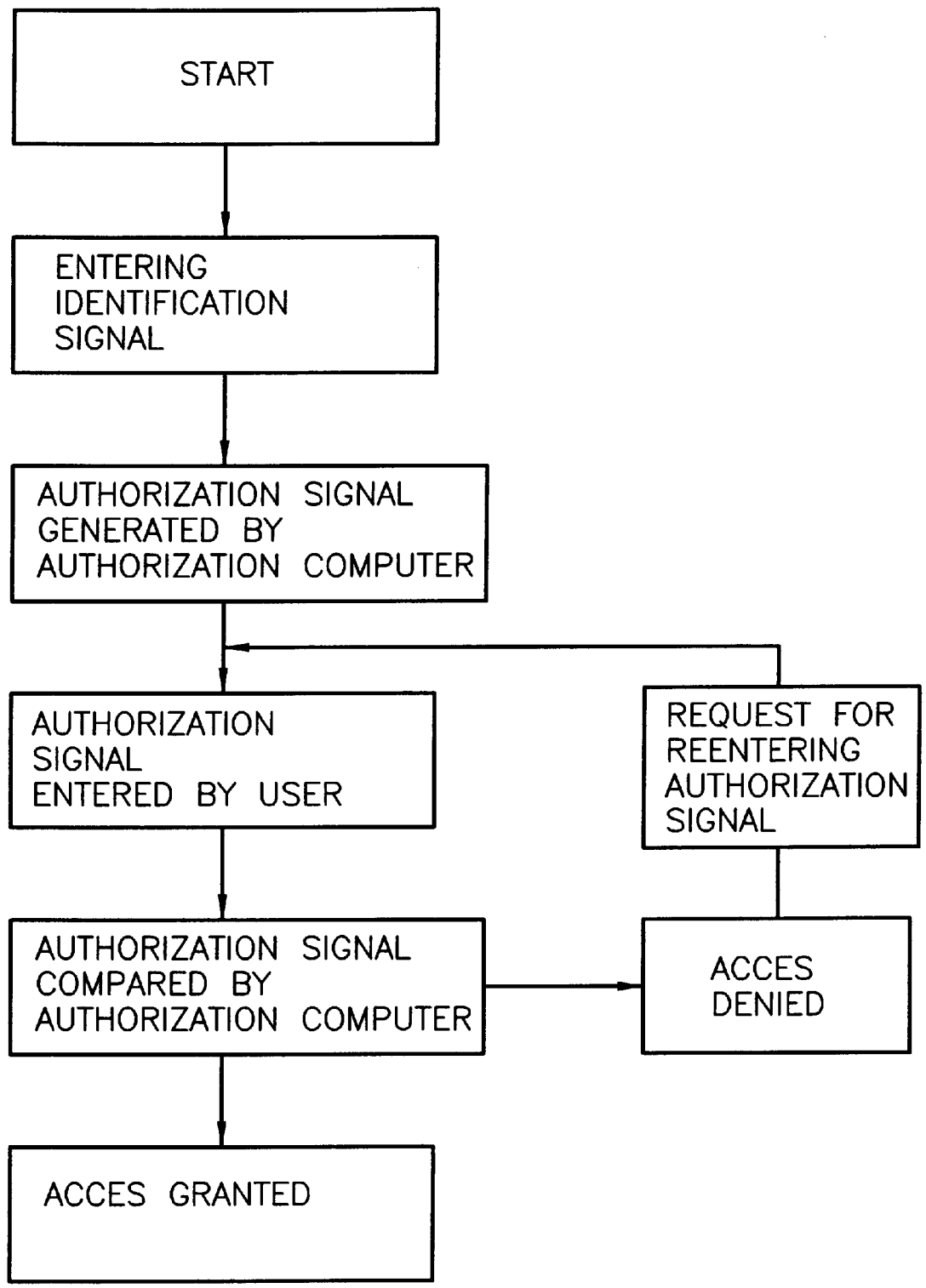
FIG. 2 is a flow chart showing an operational system employing authorization in data transmission.
Figure 3:
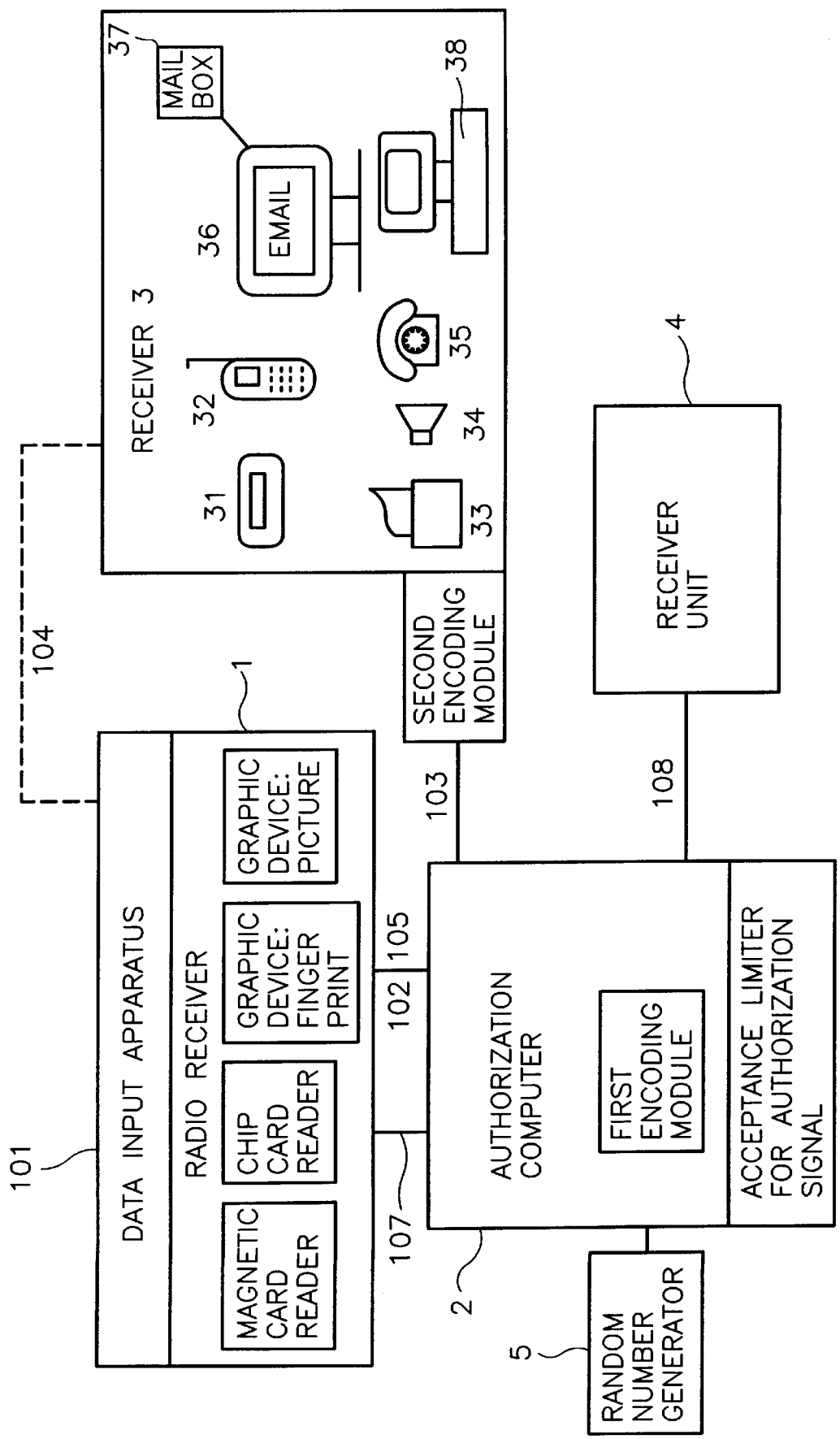
FIG. 3 is a view of a schematic diagram showing an operational system employing authorization in data transmission.

According to the present invention there is provided for a method for the authorization of data transmission systems employing a transaction authorization number (TAN) or a comparable password. The user sends according to a first step his or her qualifying identification through a data input apparatus 1, together with a request for generating or for selecting a transaction authorization number TAN or a comparable password from a data file, to an authorization computer 2. The authorization computer 2 generates the transaction authorization number TAN or the comparable password or selects the transaction authorization number TAN or the comparable password from a data file according to a second step. The authorization computer 2 sends the transaction authorization number TAN or the comparable password through a different transmission path as compared to the transmission path of the first step to a receiver 3 according to a third step. The user takes this transaction authorization number TAN or the comparable password from the receiver 3 and enters the transaction authorization number TAN or the comparable password into the data input apparatus 1 according to a fourth step. This transaction authorization number TAN or the comparable password is transmitted again to the authorization computer 2 according to a fifth step. The authorization computer 2 verifies the validity of the transaction authorization number TAN or of the comparable password according to a sixth step, in order to establish a connection between the data input apparatus 1 and a receiver unit 4 according to a seventh step.

The transaction authorization number TAN or the comparable password can be a one-time usable transaction authorization number TAN or a one time usable password. The validity of the transaction authorization number TAN or of the comparable password can be limited to a predefined user time. The validity of the transaction authorization number TAN or of the comparable password can be dependent on a predefined number of the transmitted data files or on a predefined size value of the transmitted data files.

Access to the data input apparatus 1 and/or to the receiver 3 and/or the receiver unit 4 can be protected by a password. The data transmitted from the data input apparatus 1 to the receiver unit 4 or vice versa can be encoded and the data transmitted from the data input apparatus 1 to the authorization computer 2 or vice versa are encoded.

The apparatus for the authorization of data transmission systems includes a data input apparatus 1 serving for entering a qualifying identification of a user into the data input apparatus 1 and for transmitting the qualifying identification and a request for an authorization signal from the data input apparatus 1 to the authorization computer 2 along a first transmission path. The authorization computer 2 serves for establishing the authorization signal in the authorization computer 2, and for sending the authorization signal from the authorization computer 2 to a monitor 3 along a second transmission path different as compared to the first transmission path. The monitor 3 serves for reading the authorization signal at the monitor 3 by the user. The data input apparatus 1 further serves for entering the authorization signal into the data input apparatus 1 by the user and for transmitting the authorization signal from the data input apparatus 1 to the authorization computer 2. The authorization computer 2 further serves for verifying the validity of the authorization signal in the authorization computer 2 and for establishing a connection between the data input apparatus 1 and the receiver unit 3 upon verification of the validity of the authorization signal.

The receiver 3 can be a pager 31 or a mobile or cellular phone 32. The receiver 3 can also be an email address or a net address, a telefax machine 33, or a language output apparatus or an audio reproduction unit. The language output apparatus or the audio reproduction unit can be a loud and audio speaker 34 or a telephone 35.

The receiver 3 can be a radio receiver incorporated into the data input apparatus 1. The radio receiver can furnish the transaction authorization number TAN or the comparable password on the display or monitor of the data input apparatus 1. The radio receiver can include a user identification element.

The user identification element can be a magnetic card or a chip card. The user identification element can operate with graphic devices for verifying a finger print or for a picture identification of the user.

Matching encoding modules can be present in the authorization computer 2 and in the receiver 3.

The receiver element 4 can be a door-locking mechanism.

The authorization computer 2 and the receiver unit 4 can be integrated into a single apparatus. The data input apparatus, the authorization computer 2, and the receiver unit 4 can be integrated into one single apparatus.

An authorized user actuates a data input apparatus 1. The authorized user enters and sends 101 a request for generating or for selecting and returning a transaction authorization number TAN or a comparable password to an authorization computer 2 along a transmission path 102 from the data input apparatus 1 to the authorization computer 2. The authorization computer 2 generates a transaction signal such as the transaction authorization number TAN or a comparable password. The authorization computer 2 can derive the authorization signal from a random number generator 5 or from a data file contained in the authorization computer 2. The authorization computer 2 knows the telephone number or the data address, for example the email address or net address of the receiver 3 of the user of the data input apparatus 1. The authorization computer 2 sends this transaction authorization number TAN or a comparable password to a monitor representing the receiver 3 along a transmission path 103 from the authorization computer 2 to the monitor or receiver 3. The receiver 3 can be a pager 31 or a mobile or cellular phone 32. The receiver 3 however can also be provided as the email address of a mailbox 37 and displayed on a monitor 36, a telefax apparatus 33, or a language output apparatus or audio-reproduction unit. The audio-reproduction unit can be a fixedly installed audio speaker 34 or a telephone 35. The language output apparatus can be a computer 38 reconstituting language into sound or text files.

The monitor can be a radio receiver incorporated into the data input apparatus, wherein the radio receiver furnishes the authorization signal on a display monitor of the data input apparatus. The radio receiver can include a user identification element furnished by an access card such as a magnetic card or a chip card.

The user reads this transaction authorization number or a comparable password from the receiver 3 or hears the transaction authorization number TAN from the language or audio output and enters 104 it manually into the data input apparatus 1. The data input apparatus 1 now transmits the transaction authorization number TAN or the comparable password to the authorization computer 2 along a transmission path 105 from the data input apparatus 1 to the authorization computer 2. The authorization computer 2 verifies if this transaction authorization number TAN or the comparable password are still valid. For this purpose, the authorization computer can be programmed such that the validity of the transaction authorization number or of the comparable password is limited in time between its emission to the receiver 3 and its transmission through the data input apparatus 1. The time period limitation can for example amount to two minutes. If the transaction authorization number TAN or the comparable password are valid, then the authorization computer 2 furnishes a connection 107, 108 from the data input apparatus 1 to the receiver unit 4. Now the user is able to transmit and/or to receive data from the data input apparatus 1 to the receiver unit 4 for the time period this connection 107, 108 is maintained.

It is apparent that these data can be encrypted and encoded for additional security.

It is further conceivable that not only the transaction authorization number TAN or the comparable password have a time limitation with respect to their validity, but that also the time duration of the maintaining of the connection 107, 108 between the data input apparatus 1 and the receiver apparatus 4 is limited in time. Thereby, it can be avoided that a "standing" line is furnished between the data input apparatus 1 and the receiver unit 4, which again could represent a hole in the security system.

The authorization computer 2 and the receiver unit 4 can be furnished by a single computer. In this case, a first access is performed to a data processing program, which performs the authorization process, including generation and transmission of the transaction authorization number TAN, in the manner precedingly described. The data transmission is then performed as a second step.

The data input apparatus 1, the authorization computer 2 and the receiver unit 4 can even be a single computer. In this case, a first access is performed to a data processing program, which performs the authorization process, including generation and transmission of the transaction authorization number TAN, to the receiver in the way described above. The user obtains full access to or access limited to specific regions of the computer only after authorization.

It will be understood that each of the elements described above, or two or more together, may also find a useful application in other types of authorization processes differing from the types described above.

While the invention has been illustrated and described as embodied in the context of a method for the authorization in data transmission systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A method for the authorization of data transmission systems comprising
    entering a qualifying identification of a user into a data input apparatus;
    transmitting the qualifying identification and a request for an authorization signal from the data input apparatus to an authorization computer along a first transmission path;
    establishing the authorization signal in the authorization computer;
    sending the authorization signal from the authorization computer to a monitor along a second transmission path different as compared to the first transmission path;
    reading the authorization signal at the monitor by the user;
    entering the authorization signal into the data input apparatus;
    transmitting the authorization signal from the data input apparatus to the authorization computer;
    verifying the validity of the authorization signal in the authorization computer;
    establishing a connection between the data input apparatus and a receiver unit upon verification of the validity of the authorization signal.

2. The method according to claim 1, wherein the authorization signal is transmitted from the data input apparatus to the authorization computer along the first transmission path.

3. The method according to claim 1, further comprising limiting acceptance of the authorization signal during verification of the validity of the authorization signal by the authorizing computer to a predefined number of times.

4. The method according to claim 1, further comprising limiting acceptance of the authorization signal during verification of the validity of the authorization signal by the authorizing computer to a predefined user time.

5. The method according to claim 1, further comprising limiting acceptance of the authorization signal during verification of the validity of the authorization signal by the authorizing computer depending on a predefined number of data files being transmitted.

6. The method according to claim 1, further comprising limiting acceptance of the authorization signal during verification of the validity of the authorization signal by the authorizing computer depending on a predefined size value of data files being transmitted.

7. The method according to claim 1, further comprising employing a password for allowing accessing a member selected from the group consisting of the data input apparatus, the monitor, and the receiver unit.

8. The method according to claim 1, further comprising encoding the data transmitted from the data input apparatus to the receiver unit and vice versa.

9. The method according to claim 1, further comprising encoding the data transmitted from the data input apparatus to the authorization computer and vice versa.

10. A method for the authorization of data transmission systems employing a transaction authorization number (TAN) or a comparable password, wherein
    a user sends according to a first step his or her qualifying identification through a data input apparatus (1), together with a request for generating or for selecting a transaction authorization number TAN or a comparable password from a data file, to an authorization computer (2),
    wherein the authorization computer (2) generates the transaction authorization number TAN or the comparable password or selects the transaction authorization number TAN or the comparable password from a data file according to a second step,
    wherein the authorization computer (2) sends the transaction authorization number TAN or the comparable password through a different transmission path as compared to the transmission path of the first step to a receiver (3) according to a third step,
    wherein the user takes this transaction authorization number TAN or the comparable password from the receiver (3) and enters the transaction authorization number TAN or the comparable password into the data input apparatus (1) according to a fourth step,
    wherein this transaction authorization number TAN or the comparable password is transmitted again to the authorization computer (2) according to a fifth step,
    wherein the authorization computer (2) verifies the validity of the transaction authorization number TAN or of the comparable password according to a sixth step, in order to establish a connection between the data input apparatus (1) and a receiver unit (4) according to a seventh step.

11. The method according to claim 10, wherein the transaction authorization number TAN or the comparable password is a one-time usable transaction authorization number TAN or a one time usable password; wherein the validity of the transaction authorization number TAN or of the comparable password is limited to a predefined user time; wherein the validity of the transaction authorization number TAN or of the comparable password is dependent on a predefined number of the transmitted data files; wherein the validity of the transaction authorization number TAN or of the comparable password is dependent on a predefined size value of the transmitted data files.

12. The method according to claim 10, wherein access to the data input apparatus (1) and/or to the receiver (3) and/or the receiver unit (4) is protected by a password; wherein the data transmitted from the data input apparatus (1) to the receiver unit (4) or vice versa are encoded; wherein the data transmitted from the data input apparatus (1) to the authorization computer (2) or vice versa are encoded.

13. An apparatus for authorizing access to a communication line comprising a data input apparatus for entering a qualifying identification of a user and for entering an authorization signal;

an authorization computer connected through a first transmission path to the data input apparatus for establishing an authorization signal and for verifying a received authorization signal;

a monitor connected to the authorization computer and disposed such that upon reading of an authorization signal on a monitor by a user, the user can enter the authorization signal into the data input apparatus;

a receiver unit connectable to the data input apparatus through a line switchable by the authorization computer between a connected state and a disconnected state upon verification of the validity of the entered authorization signal in the authorization computer.

14. The apparatus according to claim 13, wherein the monitor 51 is a member selected from the group consisting of a pager, a cellular phone, an email address, a net address, a telefax machine, a language output apparatus, an audio reproduction unit, a radio receiver, and a telephone.

15. The apparatus according to claim 13, further comprising a first encoding module present in the authorization computer;

a second encoding module present in the monitor, wherein an encoding provided by the first encoding module matches an encoding of the second encoding module.

16. The apparatus according to claim 13, wherein the receiver unit furnishes a door-locking mechanism.

17. The apparatus according to claim 13, wherein the authorization computer and the receiver unit are integrated into a single apparatus.

18. The apparatus according to claim 13, wherein the data input apparatus, the authorization computer, and the receiver unit are integrated into one single apparatus.

19. The apparatus according to claim 13, wherein the data input apparatus serves for entering a qualifying identification of a user into the data input apparatus and for transmitting the qualifying identification and a request for an authorization signal from the data input apparatus to the authorization computer along a first transmission path;

wherein the authorization computer serves for establishing the authorization signal in the authorization computer, and for sending the authorization signal from the authorization computer to a monitor along a second transmission path different as compared to the first transmission path;

wherein the monitor serves for reading the authorization signal at the monitor by the user;

wherein the data input apparatus further serves for entering the authorization signal into the data input apparatus by the user and for transmitting the authorization signal from the data input apparatus to the authorization computer;

wherein the authorization computer further serves for verifying the validity of the authorization signal in the authorization computer and for establishing a connection between the data input apparatus and the receiver unit upon verification of the validity of the authorization signal.

20. The apparatus according to claim 13, wherein the monitor is a radio receiver incorporated into the data input apparatus, wherein the radio receiver furnishes the authorization signal on a display monitor of the data input apparatus.

21. The apparatus according claim 20, wherein the radio receiver includes a user identification element furnished by a member selected from the group consisting of a magnetic card reader, a chip card reader, a graphic device for fingerprint identification, and a graphic device for picture identification.

* * * * *